(12) United States Patent
Ogatsu

(10) Patent No.: US 7,908,715 B2
(45) Date of Patent: Mar. 22, 2011

(54) STRAP HOLDER FOR A MOBILE DEVICE

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 248 days.

(21) Appl. No.: 12/064,728

(22) PCT Filed: Aug. 23, 2006

(86) PCT No.: PCT/JP2006/316480
§ 371 (c)(1),
(2), (4) Date: Feb. 25, 2008

(87) PCT Pub. No.: WO2007/023848
PCT Pub. Date: Mar. 1, 2007

(65) Prior Publication Data
US 2009/0241299 A1 Oct. 1, 2009

(30) Foreign Application Priority Data
Aug. 25, 2005 (JP) ................................. 2005-244827

(51) Int. Cl.
*A45F 5/00* (2006.01)
(52) U.S. Cl. ......... 24/3.1; 455/575.6; 224/255; 224/930
(58) Field of Classification Search ................... 24/3.12, 24/3.1, 3.13, 458, 265 AL, 265 R, 186; 455/575.1, 455/575.6; 224/255, 930; 361/679.01
See application file for complete search history.

(56) References Cited

U.S. PATENT DOCUMENTS

| 2,455,765 | A | * | 12/1948 | Harvey | 224/255 |
| 4,577,374 | A | * | 3/1986 | Lii | 24/165 |
| 5,709,012 | A | * | 1/1998 | Ebashi | 24/3.11 |
| 6,032,337 | A | * | 3/2000 | Rankin et al. | 24/3.12 |
| 6,487,756 | B1 | * | 12/2002 | Vidal, Jr. | 24/3.1 |
| 6,591,642 | B1 | * | 7/2003 | Kuo | 70/58 |
| 2002/0070903 | A1 | * | 6/2002 | Nakamura et al. | 343/702 |
| 2008/0061058 | A1 | * | 3/2008 | Wang et al. | 220/4.02 |
| 2009/0143116 | A1 | * | 6/2009 | Harmon et al. | 455/575.6 |
| 2009/0290296 | A1 | * | 11/2009 | Stiehl et al. | 361/679.01 |

FOREIGN PATENT DOCUMENTS

| JP | 05-11579 | 2/1993 |
| JP | 05-191057 | 7/1993 |
| JP | 08-274852 | 10/1996 |
| JP | 10-107453 A | 4/1998 |
| JP | 2003-273529 | 9/2003 |
| JP | 2005-109224 | 4/2005 |

* cited by examiner

*Primary Examiner* — Robert J Sandy
*Assistant Examiner* — Michael Lee
(74) *Attorney, Agent, or Firm* — Dickstein Shapiro LLP

(57) ABSTRACT

A hinge portion of a case has a strap holder concavity into which a strap holder component is inserted, and a second pin hole into which a securing pin is inserted. A first pin hole into which a securing pin is inserted is formed in a strap holder component. As a result, lightly press-fitting the strap holder component into the strap holder concavity, and inserting the securing pin into the second pin hole and the first pin hole will cause the strap holder component to be secured to the case. This strap holder for a mobile device has a compact and high-strength structure.

4 Claims, 8 Drawing Sheets

STRAP HOLDER FOR A MOBILE DEVICE

TECHNICAL FIELD

The present invention relates to a strap holder for cellular telephones, digital cameras, PDAs (personal digital assistants), and other mobile devices.

BACKGROUND ART

Mobile devices often have a strap in the form of a cord that is attached to a strap holder in order to prevent the device from being dropped when carried. Therefore, an opening through which the strap is passed, i.e. a strap holder, is formed in these mobile devices. Generally, strap holders are often formed in a resin portion, as noted in Patent Document 1. A strap holder may also be attached to the mobile device as a separate article, as recorded in Patent Documents 2 through 4.

Patent Document 1: Japanese Laid-open Patent Application No. 8-274852
Patent Document 2: Japanese Laid-open Patent Application No. 2005-109224
Patent Document 3: Japanese Laid-open Patent Application No. 2003-273529
Patent Document 4: Japanese Laid-open Patent Application No. 05-191057

DISCLOSURE OF THE INVENTION

Problem the Invention is Intended to Solve

However, a variety of problems are presented with the conventional case structures disclosed in these patent documents. First, when a strap holder is formed by molding a resin, the cross-sectional area of the strap holder portion must be increased in order to ensure strength, as mentioned in Patent Document 1. Therefore, mobile devices that have a strong requirement to be made compact and thin have been problematic in that providing a strap holder has proved to be an obstacle to such requirements.

Furthermore, the strap holder must be situated in a corner region of the mobile device when a resin is molded to form the strap holder because the direction in which the molding die is removed must be taken into account, which places restrictions in regard to mounting.

Furthermore, although a greater degree of freedom is achieved in regard to where the strap holder is located when the holder is provided as a separate article, as recorded in Patent Documents 2 through 4, concerns regarding the portion needed for attachment necessitate the strap opening being disposed in a protruding part.

With the foregoing problems in view, it is an object of the present invention to provide a strap holder for a mobile device having a compact and high-strength structure and having exceptional designability.

Means for Solving the Problem

The strap holder for a mobile device according to a first aspect of the invention of the present application is a strap holder for a mobile device wherein a hole into which a strap belt is inserted and a part for fitting to a main body are integrally formed, characterized in comprising: a concavity provided to a case of a mobile device; a metallic strap holder component fitted within the concavity and having a portion for securing a strap; a first pin hole that passes through an interior of the strap holder component; a second pin hole provided to the case so that openings are formed in two locations on an interior surface of the concavity, and the two openings are in mutual opposition facing the concavity; and a pin inserted through both the first pin hole and the second pin hole in a state wherein the strap holder component has been fitted in the concavity.

The strap holder for a mobile device according to a second aspect of the invention of the present application is characterized in comprising: a concavity provided to a case of a mobile device; a metallic strap holder component fitted in the concavity, and having a portion for locking a strap; a groove formed in a side surface part of the strap holder component; and a securing piece, which has a notch provided so as to be capable of moving closer to or away from the strap component inside the case, and which fits into the groove when close to the strap component.

The strap holder for a mobile device according to a third aspect of the invention of the present application is characterized in comprising: a concavity provided on a case of a mobile device; a metallic strap holder component fitted in the concavity and having a portion for locking a strap; a first pin hole that passes through an interior of the strap holder component; a pin channel provided to the case and opening on a side surface of the concavity; and a pin for being inserted through the pin channel and into the first pin hole when the strap holder component is in a state of having been fitted in the concavity; wherein the pin channel locks the securing pin so that the strap holder component does not come out of the concavity when the securing pin is in a state of having been inserted through the first pin hole.

The strap holder component for such strap holders for mobile devices is preferably manufactured from resin or from a metal selected from a group consisting of stainless steel, aluminum and aluminum alloys, and magnesium and magnesium alloys. Using a metal enables high strength to be adequately maintained even if the component is made smaller. Resin materials having strength similar to that of a metal may also be used; moreover, if a greater thickness is permitted, common resin materials may be used for molding.

In the present invention, a metallic strap holder component is fitted into a concavity of a case using light press fitting or another technique, and is secured to the case by a pin or a securing piece. Due to having been lightly press fitted, the metallic strap holder will not readily slant toward every load direction applied thereto. Having a structure in which both ends are supported and secured using pins allows the metallic strap holder to have a greater load resistance in the folding direction, even if thin pins are used. Consequently, the load applied to the case from each direction via the strap can be evenly borne, strength is high even under moment loading, and loosening does not readily occur; therefore, use over prolonged periods of time tends not to be problematic.

EFFECT OF THE INVENTION

According to the present invention, the location of the strap holder component can be selected unrestrictedly, and the strap holder component can be located in the hinge portion or another open space of the case. According to the present invention, further, the strap holder component exhibits sufficient strength even when made smaller as a result of being made of metal, and is readily assembled as a result of being secured using pins. In the present invention a metallic component is understood to include alloys as well as pure metals. According to the present invention, further, excellent design

BRIEF DESCRIPTION OF THE DRAWINGS

FIG. 5 is a perspective view showing a strap holder component 300 of the present embodiment, wherein

KEY

Figure 1:
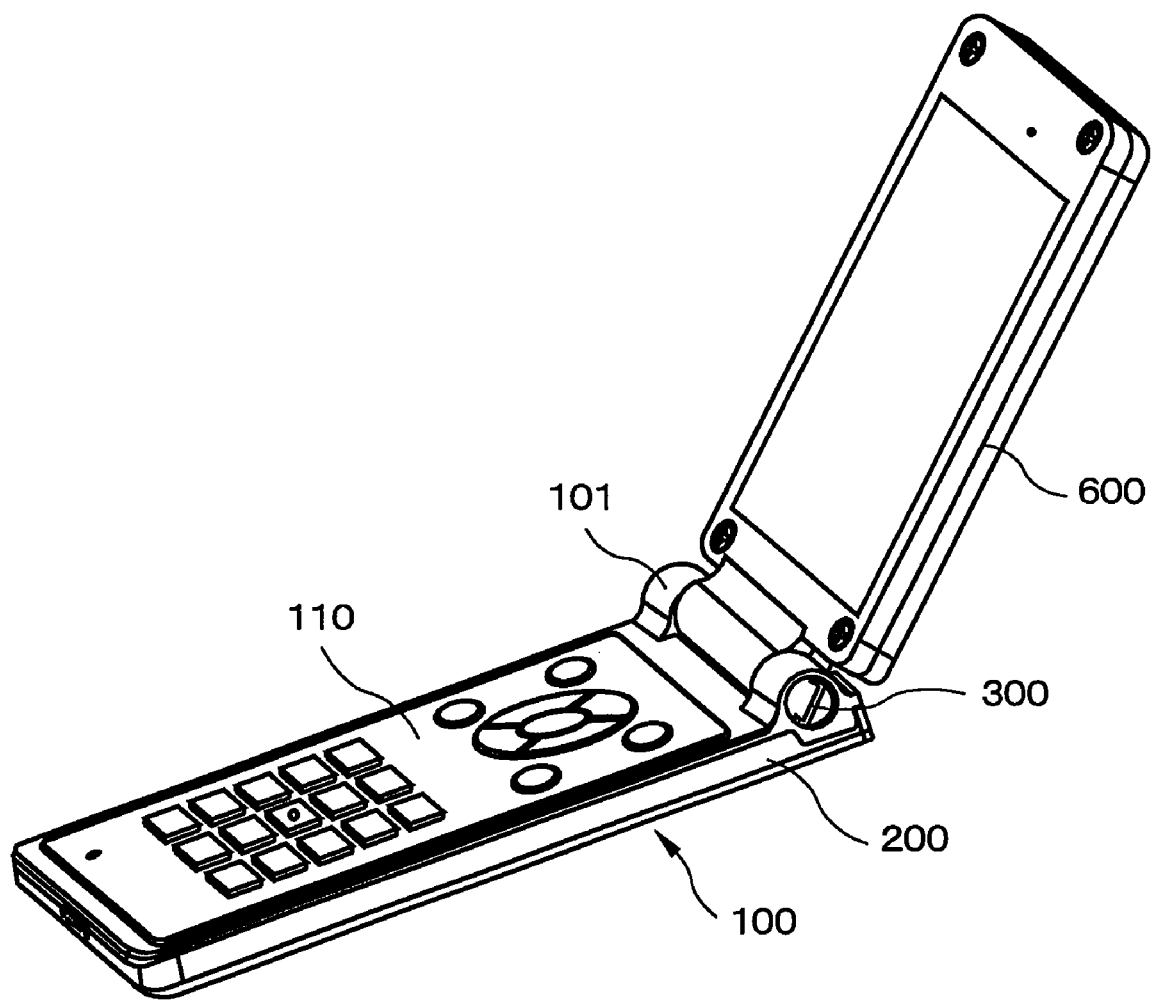
FIG. 1 is a perspective view showing a cellular phone provided with a strap holder according to Embodiment 1 of the present invention.

100: case
101: hinge portion
102: concavity
103: pin hole
105: flat portion
104: opening
106: rib
107: pin concavity
108: bump
109: bearing surface
110: key sheet unit
120: groove
200: rear cover
300: strap holder component
301: fitting part
302: flat portion
303: pin hole
304: chamfer
305: bump
306: locking portion
307: bearing surface
310: groove
400: pin
500: securing bracket
501: notch
600: display

BEST MODE FOR CARRYING OUT THE INVENTION

Figure 2:
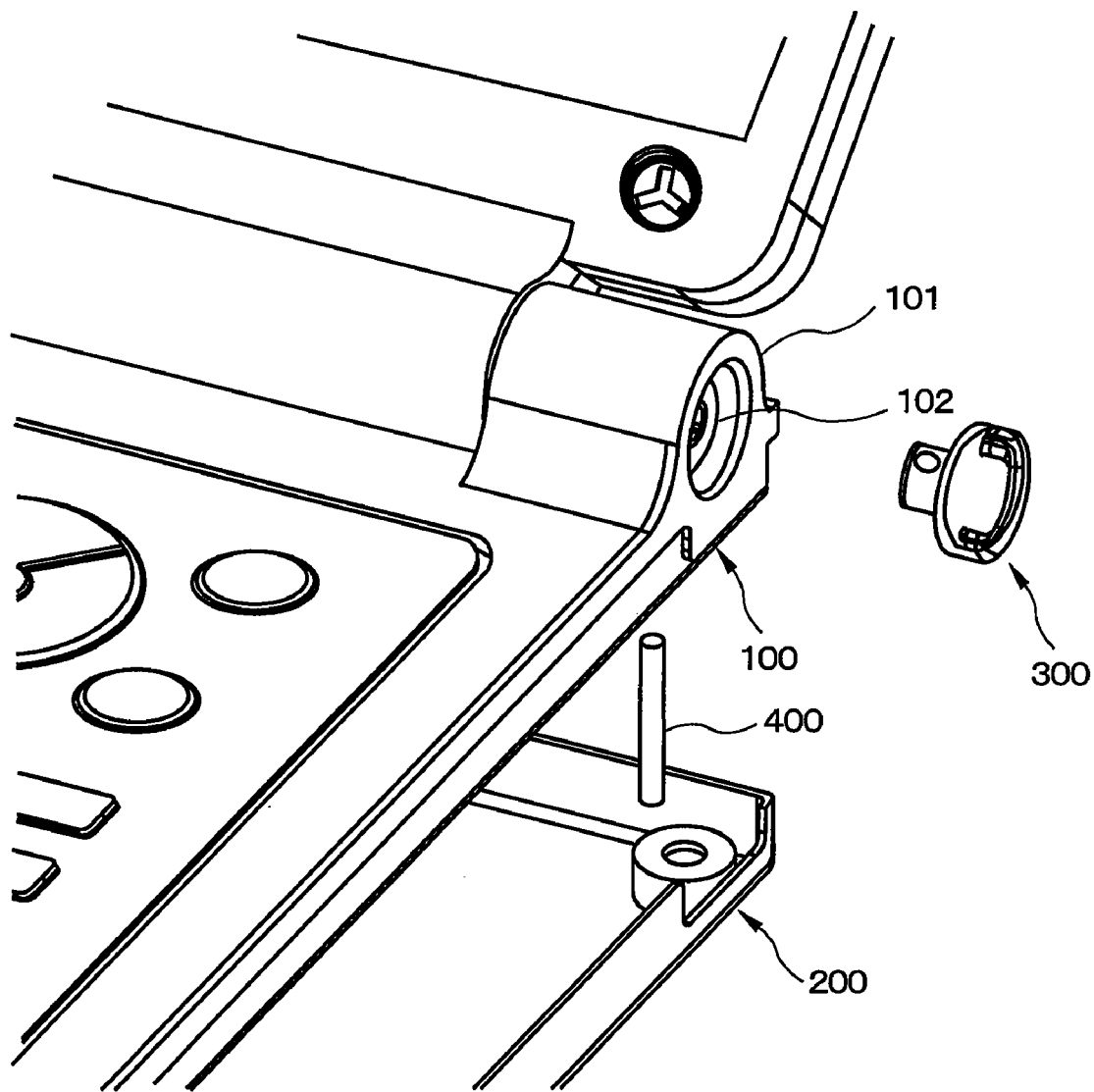
FIG. 2 is a partial perspective view showing the holder component of the strap holder in a disassembled state.
Figure 3:
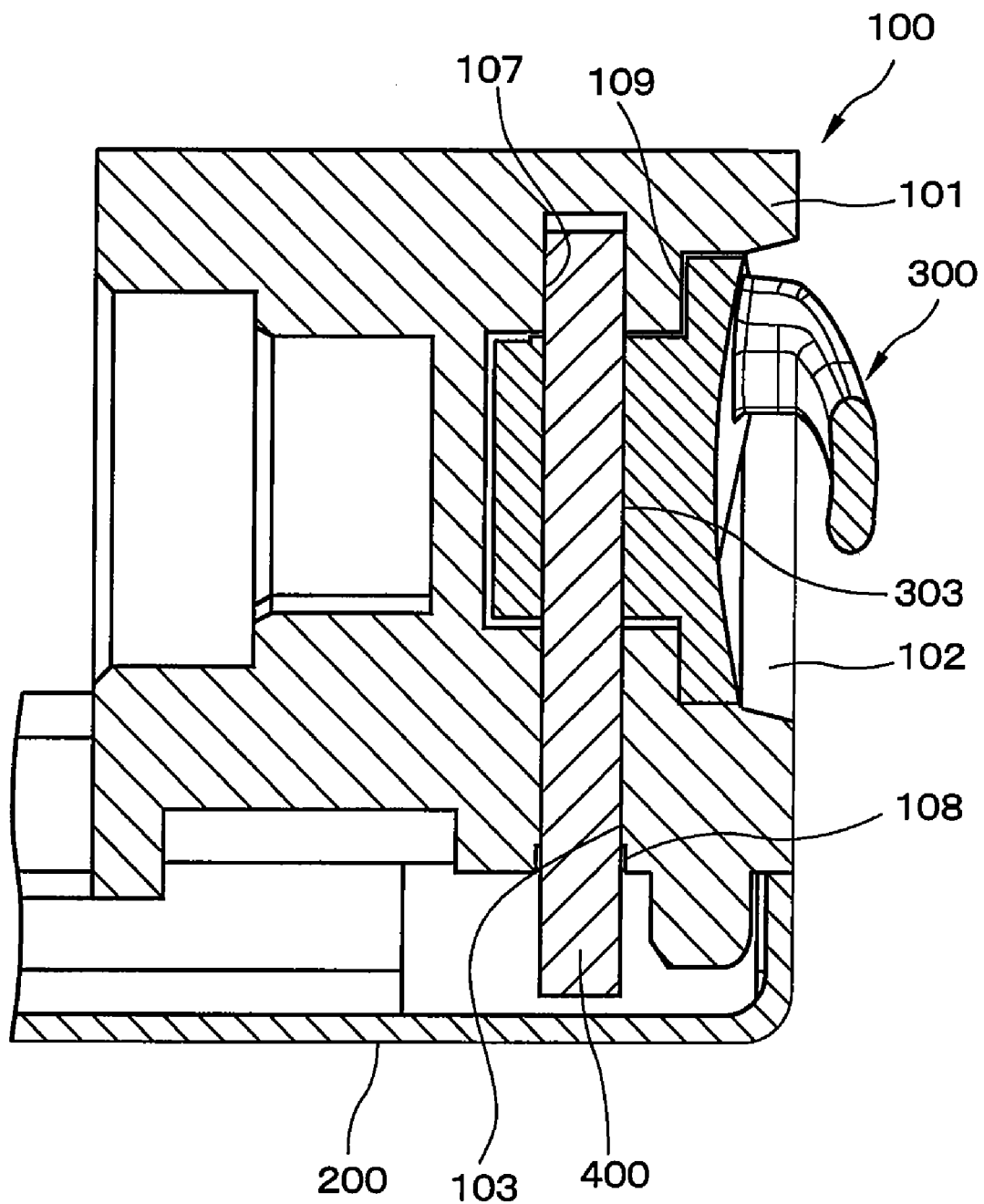
FIG. 3 is a cross-sectional view showing the holder portion.
Figure 4A:
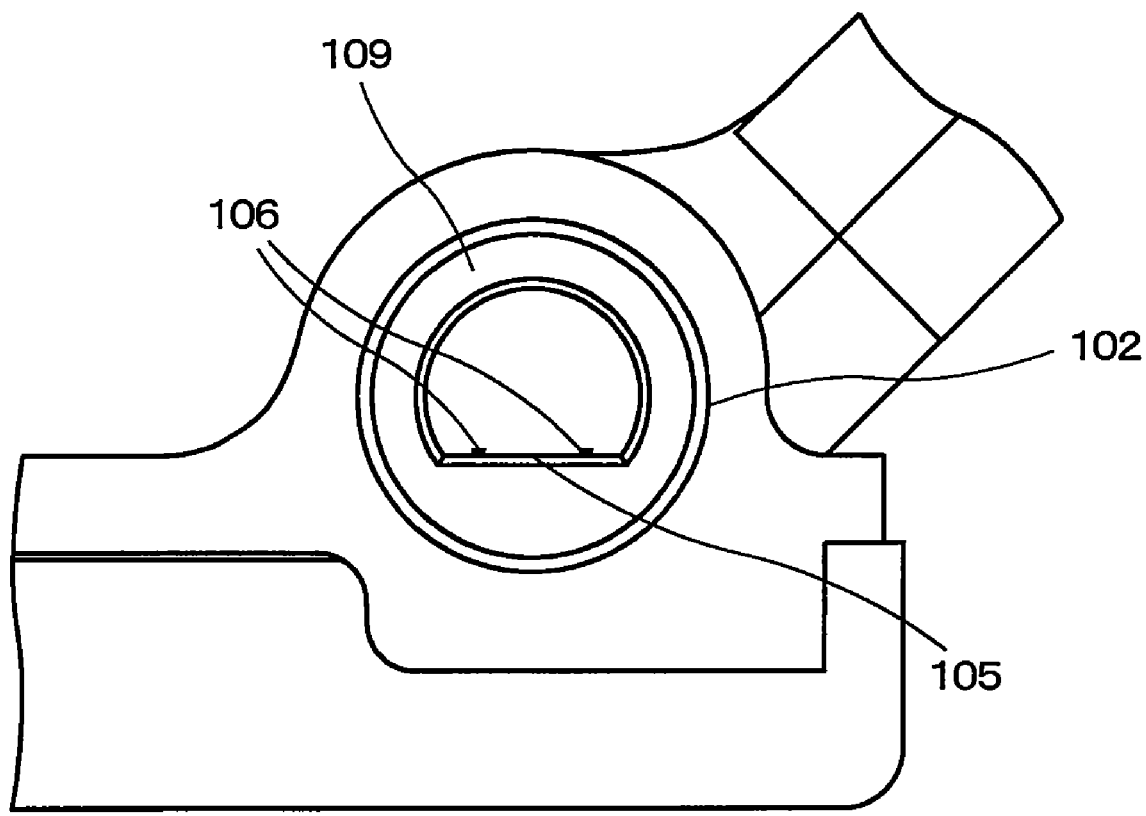
FIG. 4 is an enlarged view of a strap holder attachment portion of a case of the present embodiment.
Figure 4B:
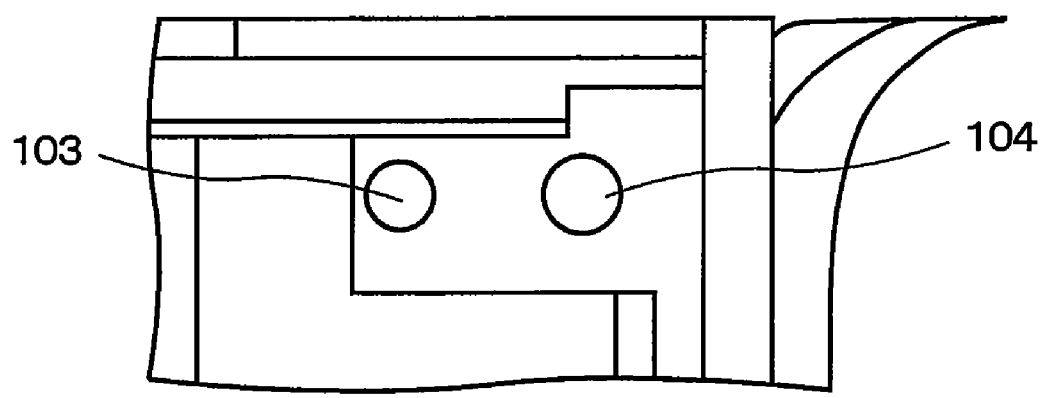
Figure 5A:
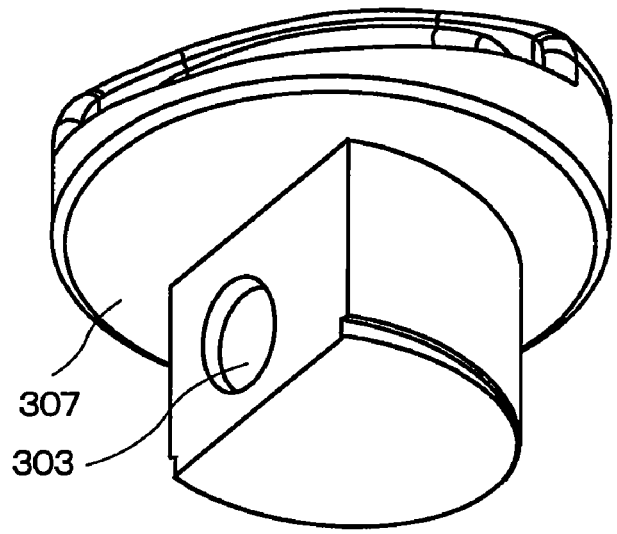
FIG. 5A is a perspective view seen obliquely from above.
Figure 5B:
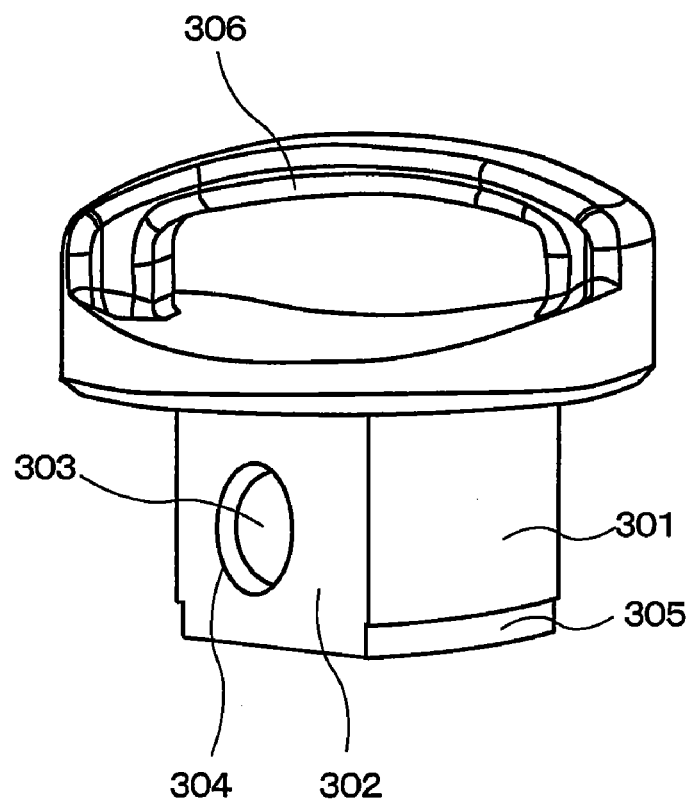
FIG. 5B is a perspective view seen horizontally.

Next, embodiments of the present invention will be described in detail with reference to the attached diagrams. FIG. 1 is a perspective view showing a cellular telephone provided with a strap holder according to Embodiment 1 of the present invention; FIG. 2 is a partial perspective view showing the holder piece of the strap holder in a disassembled state; FIG. 3 is a cross-sectional view showing the holder portion; FIG. 4 is an enlarged view of a strap holder attachment portion of a case of the present embodiment; and FIG. 5 is a perspective view showing a strap holder component 300 of the present embodiment, wherein FIG. 5A is a perspective view seen obliquely from above, and FIG. 5B is a perspective view seen horizontally.

As shown in FIG. 1, a key sheet unit 110 on which operation buttons are formed, and key switches on a lower layer of the key sheet unit, are disposed on the face of a case 100; and the case 100 and a display 600 comprising a liquid crystal display are connected so as to be able to rotate with respect to one another via a hinge part 101. A rear cover 200 is mounted on a rear face of the case 100. A strap holder component 300 is disposed on the hinge part 101 of the case 100, and is able to secure a strap.

Figure 6:
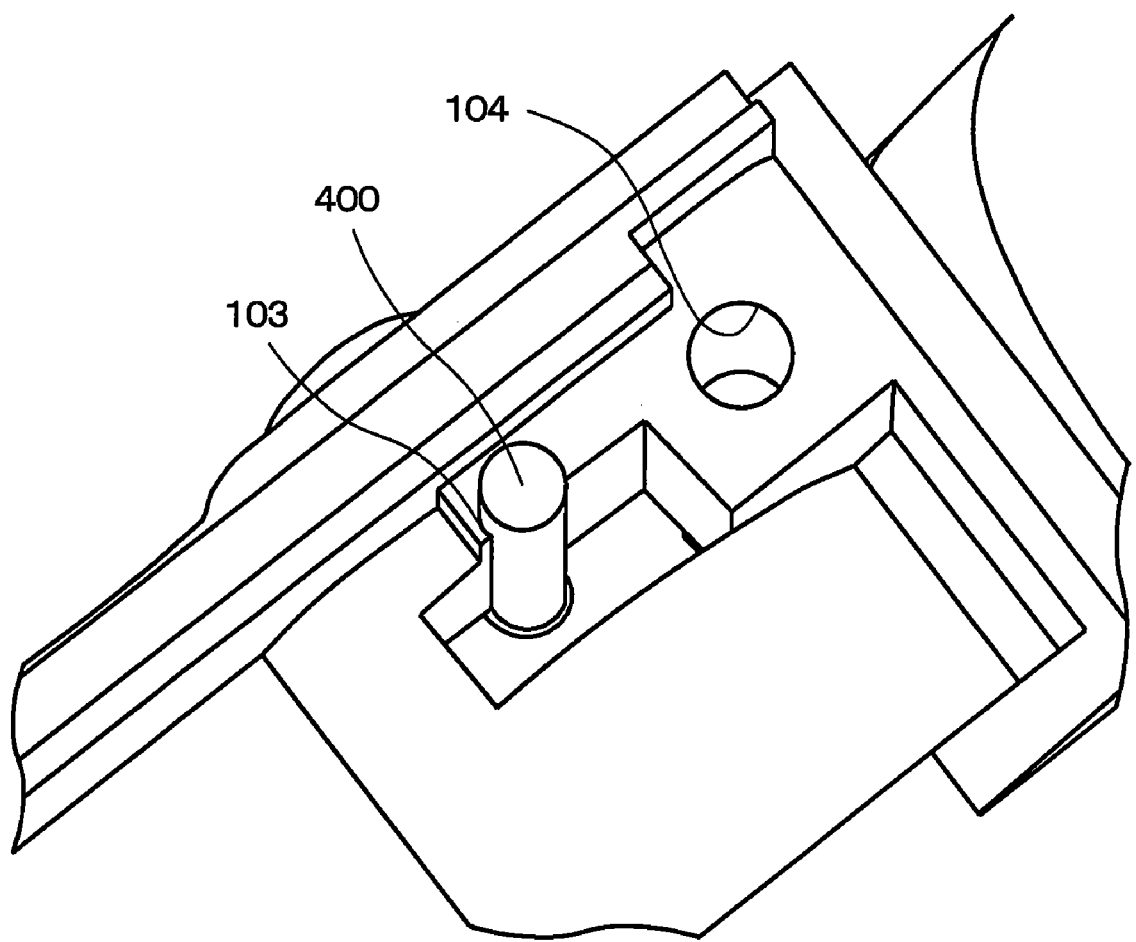
FIG. 6 is a perspective view showing a variation of Embodiment 1, and depicts the case as seen from below.

A strap holder concavity 102 into which the strap holder component 300 is inserted, and a second pin hole 103 through which a securing pin 400 passes, are provided to the hinge part 101 of the case 100, as shown in FIG. 2 and FIG. 3. A pin concavity 107 for accommodating a distal end of the securing pin 400 is formed in the case 100 along an extension of the second pin hole 103. The transverse cross-sectional shapes of the second pin hole 103 and the pin concavity 107 are the same, and correspond to the transverse cross-sectional shape of the securing pin 400. Securing screw holes 104 are formed on the four corners of the case 100, as shown in FIG. 6. The rear cover 200 and the case 100 are secured using screws (not shown) that pass through the rear cover 200 and are screwed into the securing screw holes 104. The concavity 102 opens on an edge of the hinge part 101 and the axial direction of the hinge part 101 is regarded as the depth direction of the concavity 102. The strap holder component 300 is pressed into the concavity 102 in the axial direction of the hinge part 101, and is thereby fitted into the concavity 102.

A fitting part 301 associated with the strap holder component 300 and fitted in the concavity 102 has a transverse cross-section in the shape of a circle having an edge cut to form a bow-shape, as shown in FIG. 5, rather than being perfectly circular. Therefore, the fitting part 301 has a flat portion 302 on a peripheral surface thereof. The concavity 102 is also cut to make a bow-shape in the same manner as the cross-section of the strap holder component 300, and has a flat portion 105 on a peripheral surface thereof. Therefore, the concavity 102 has a shape corresponding to the fitting part 301 of the strap holder component 300. The fitting part 301 of the strap holder component 300 and the concavity 102 are of a size such that a slight force is required when the strap holder component 300 is inserted into the concavity 102, and are configured so that a user can readily insert the strap holder component 300 into the concavity 102 by hand. The strap holder component 300 does not rotate with respect to the case 100 to which the concavity 102 is provided because the fitting part 301 of the strap holder component 300 and the concavity 102 are cut into mutually corresponding bow-shapes. A rib 106 is provided to a side surface inside the concavity 102, as shown in FIG. 4, contributing a force that resists the insertion of the fitting part 301 of the strap holder component 300 that is lightly press-fitted into the concavity 102. Consequently, adjusting the height of the rib 106 eliminates the gap between the fitting part 301 and the concavity 102 and makes it possible to impart a suitable degree of resistance against the insertion. The fitting part 301 will not move within the concavity 102, and any rattling of the strap holder component 300 against the case 100 will be prevented.

A first pin hole 303 through which a securing pin 400 passes is provided to the fitting part 301 of the strap holder component 300. A chamfer (taper) 304 for encouraging the insertion of the securing pin 400 is provided to the entrance of the first pin hole 303. A bump 305 for encouraging insertion of the joint into the concavity 102 is provided to the fitting part 301. A strap locking portion 306 through which a strap is passed and locked is provided to a distal end of the strap holder component 300.

The securing pin 400 is preferably press-fitted into the second pin hole 103, and accordingly a very small bump 108 is provided to the insertion entrance of the second pin hole 103, as shown in FIG. 3. Two second pin holes 103 are provided to the case so as to be open in two locations on the inside surface of the concavity 102. These two openings face the concavity 102 in mutual opposition. Therefore, the structure of the second pin hole 103 runs linearly through the open space of the concavity 102.

A description shall be provided hereunder of the operation of the strap holder for a mobile device according to the present embodiment configured as described above. First, the strap holder component 300 is lightly press fitted into the strap holder concavity 102. When this is accomplished, the first pinhole 303 of the fitting part 301 of the strap holder component 300 aligns with the second pin hole 103 of the case 100 and the pin concavity 107. Consequently, when the securing pin 400 is inserted into the second pin hole 103 of the case 100 after the strap holder component 300 has been press-fitted, the securing pin 400 passes through the first pin hole 303 and enters the pin concavity 107. The securing pin 400 has a transverse cross-section that is substantially as large as the transverse cross-sections of the first pin hole 303, the second pin hole 103, and the pin concavity 107; has slight insertion resistance, and is lightly press fitted into these openings. The strap holder component is secured within the concavity 102 by the securing pin 400 so as not to slip out from the concavity 102. The second pin hole 103 passes through the case in two locations on the internal surface of the concavity 107, as shown in the drawings. The securing pin 400 will be supported at these two locations on the internal surface of the concavity 107; therefore, adequate strength can be obtained even using a pin of small diameter. The support provided at the two locations on the internal surface of the concavity 107 causes the shear stress of the pin with respect to the force with which the strap holder is pulled to be half as much as when support is provided to one side (one location). Generally, the shear load F and the shear stress $\tau$ for a radius R are expressed as $\tau=F/(\pi R^2)$. Therefore, adopting a construction that gives support at both ends of the first pin hole 303 makes it possible to obtain a withstand load that is equivalent to that when support is provided on one end using a pin diameter of $\sqrt{2}$ times as large. After the securing pin 400 has been lightly press-fitted inside the hole, the rear cover 200 is bolted securely to a rear side of the case 100. Consequently, the securing pin 400 will be held in place by the rear cover 200 while being secured via friction within the second pin hole 103 of the case 100, and will be certain not to slip out from the second pin hole 103. Therefore, the strap holder component 300 will not detach from the case 100.

The fitting part 301 of the strap holder component 300 and the strap holder concavity 102 of the case 100 are in contact with one another, as are a bearing surface 307 of the strap holder component 300 and a bearing surface 109 of the case 100. Therefore, even when the strap holder component 300 is subjected to a load or moment across the entire circumferential direction, no rattling will occur in the strap holder component 300.

When the securing pin 400 has been inserted into the second pin hole 103, and subjected to a stress that almost causes the strap holder component 300 to come off, the second pin hole 103 will hold the securing pin 400 within the case 100. Therefore, the second pin hole 103 is not necessarily required to be column-shaped. Consequently, the part supporting the securing pin 400 inside the case 100 does not have to be an opening similar to the second pin hole 103, and may even be a part that is not regarded as a hole; e.g., a wall for locking a part of the securing pin 400 that has a semicircular cross-section, as shown in FIG. 6.

The strap holder component 300 can be molded by subjecting an aluminum alloy to die casting or lost wax casting, subjecting a magnesium alloy to thixomolding, and subjecting stainless steel to metal injection molding. The strap holder component 300 may also be molded by press casting or otherwise processing the above materials. The present invention is different from cases involving a twist lock and does not require that a complex shape be molded; therefore, a variety of processing methods can be employed, and a high-strength strap holder can be obtained inexpensively.

Particularly if stainless steel and other high strength materials are used, adequately high strength can be ensured even when the strap first pin hole 303 section is thin. A part of a strap locking portion 306 exposed to the exterior has exceptional designability due to the high degree of design latitude. The strap locking portion 306 can be plated or otherwise decorated. Most of the outer circumference of the strap holder component 300 is cylindrically shaped; therefore, a moment load applied to the strap holder component 300 from all directions can be evenly borne, and loosening due to deformation and other factors can be minimized.

Figure 7:
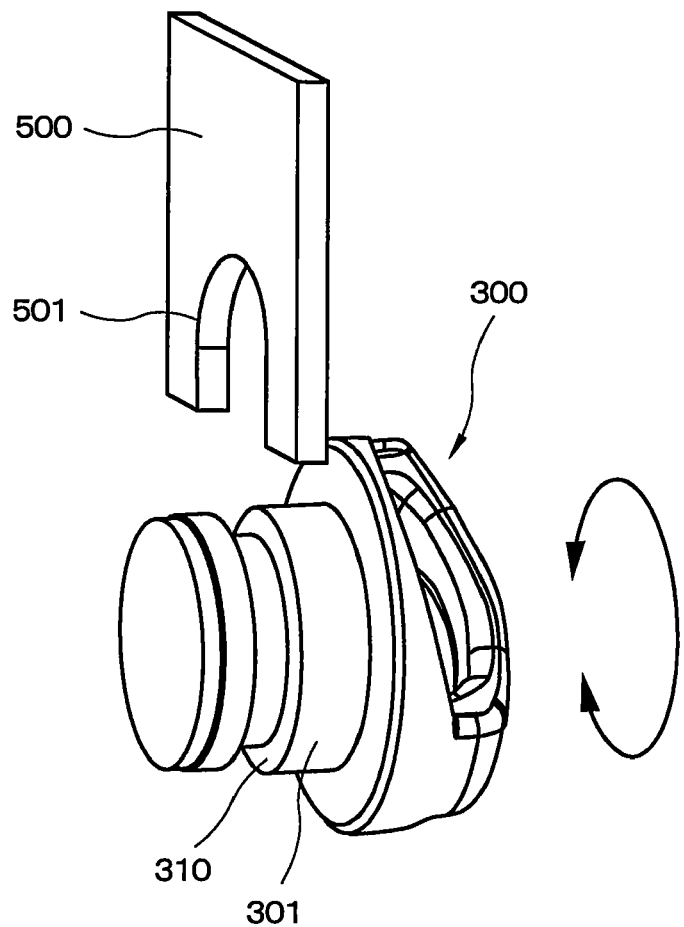
FIG. 7 is an exploded view of Embodiment 2 of the present invention.
Figure 8:
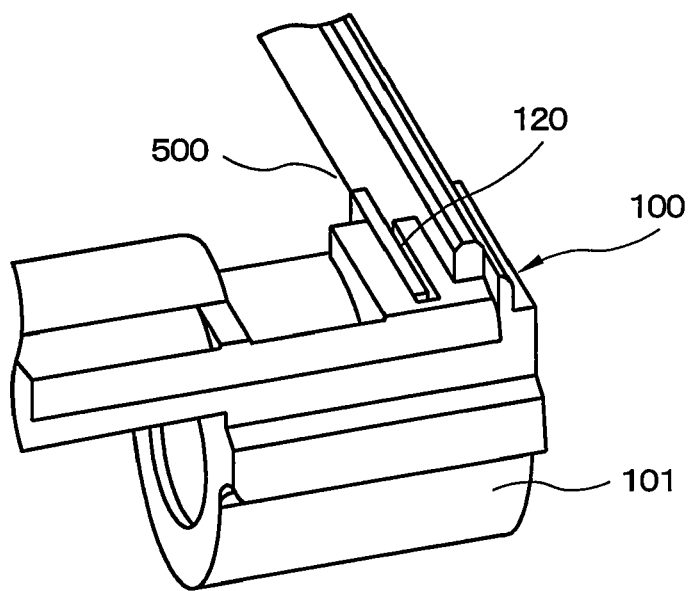
FIG. 8 is a perspective view of the case after a securing bracket has been attached thereto, and depicts the case as seen from below.
Figure 9:
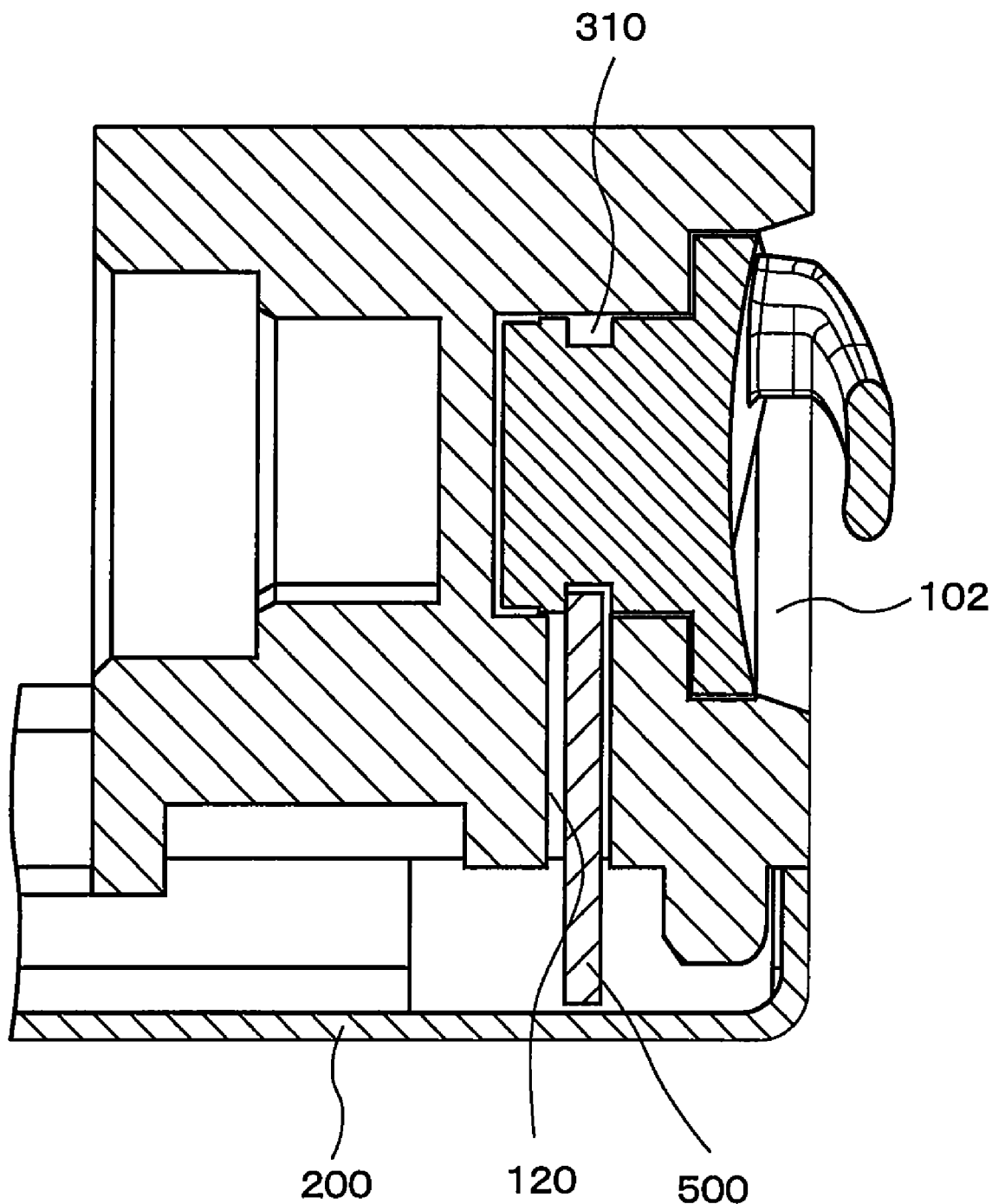
FIG. 9 is a sectional view of the same.

Next, Embodiment 2 of the present invention will be described with reference to FIG. 7. FIG. 7 is an exploded view of Embodiment 2 of the present invention, FIG. 8 is a perspective view showing a securing bracket attached to the case, and FIG. 9 is a sectional view. As shown in FIG. 7, a groove 310 is provided to the fitting part 301 in the strap holder component 300 of the present embodiment, in place of the first pin hole 303 shown in FIG. 5. In the present embodiment, specifically, the fitting part 301 is fashioned in the shape of a column devoid of a bow-shaped notch, and the groove 310, which extends in the circumferential direction, is formed on the peripheral surface. A securing bracket 500, used as a securing piece, is fashioned in the shape of a flat plate, and comprises a semicircular notch 501. The notch 501 fits in the groove 310. A groove 120 into which the plate-shaped securing bracket 500 is inserted is formed in the vicinity of a hinge portion 101 of the case 100, as shown in FIGS. 8 and 9. Inserting the securing bracket 500 in the groove 120 results in the notch 501 fitting in the circular groove 310 of the fitting part 301 of the strap holder component 300. The strap holder component 300 accordingly does not come out from the concavity 102. The securing bracket 500 is prevented from coming out of the groove 120 by the rear cover 200.

In the present embodiment, the fitting part 301 is column-shaped and the concavity 102 has a circular cross-section. The circular notch 501 of the securing bracket 500 is only fitted to the groove 310 formed on the inner peripheral surface of the fitting part 301; therefore, the strap holder component 300 can rotate around the central axis once in an installed state. In this case, some degree of rattling will occur, but any increase thereof is minimal because load can be borne by the fitting part 301. Also, performing a treatment to increase the lubricity of the surface of the strap holder component 300 makes any rotational movement smoother, and any increase in rattling due to wear can be minimized.

INDUSTRIAL APPLICABILITY

The present invention is useful as a strap holder for cellular telephones, PDAs, and other mobile devices.

The invention claimed is:

1. A strap holder for a mobile device wherein a hole into which a strap belt is inserted and a part for fitting to a main body are integrally formed, the strap holder for a mobile device comprising:
   a concavity provided to a case of a mobile device;
   a strap holder component having a fitting part fitted within the concavity and a portion for securing a strap;
   a first pin hole that passes through an interior of the strap holder component in a direction perpendicular to a direction in which the fitting part is fitted;
   a second pin hole provided to said case so that openings are formed in two locations on an interior surface of said concavity, and the two openings are in mutual opposition facing said concavity; and
   a pin inserted through both said first pin hole and said second pin hole in a state wherein said strap holder component has been fitted in said concavity, wherein
   said fitting part has a cylindrical shape and has a planar part in a circumference surface thereof to prevent the fitting part from rotating in a circumferential direction thereof; and
   said concavity has a transverse cross-sectional shape corresponding to the shape of said fitting part of said strap holder component.

2. A strap holder for a mobile device comprising:
   a concavity provided on a case of a mobile device;
   a strap holder component having a fitting part fitted in the concavity and a portion for locking a strap;
   a first pin hole that passes through an interior of the strap holder component in a direction perpendicular to a direction in which the fitting part is fitted;
   a pin channel provided to said case and opening on a side surface of said concavity; and
   a pin for being inserted through said pin channel and into said first pin hole when said strap holder component is in a state of having been fitted in said concavity; wherein
   said fitting part has a cylindrical shape and has a planar part in a circumference surface thereof to prevent the fitting part from rotating in a circumferential direction thereof;
   said concavity has a transverse cross-sectional shape corresponding to the shape of said fitting part of said strap holder component; and
   said pin channel locks said securing pin so that said strap holder component does not come out of said concavity when said securing pin is in a state of having been inserted through said first pin hole.

3. The strap holder for a mobile device according to claim 1, wherein the strap holder component is manufactured from a resin or from a metal selected from a group consisting of stainless steel, aluminum and aluminum alloys, and magnesium and magnesium alloys.

4. The strap holder for a mobile device according to claim 2, wherein the strap holder component is manufactured from a resin or from a metal selected from a group consisting of stainless steel, aluminum and aluminum alloys, and magnesium and magnesium alloys.

* * * * *